United States Patent
Daly, Jr. et al.

(10) Patent No.: US 10,061,860 B2
(45) Date of Patent: Aug. 28, 2018

(54) METHOD AND SYSTEM FOR PERSONALIZING WEB PAGE LAYOUT

(75) Inventors: Timothy P. Daly, Jr., San Jose, CA (US); Evgeniy Makeev, Cuppertino, CA (US); Annie Cheng, Milpitas, CA (US); Jeff Budzinski, San Jose, CA (US); Scott Roy, Palo Alto, CA (US)

(73) Assignee: OATH INC., New York, NY (US)

( * ) Notice: Subject to any disclaimer, the term of this patent is extended or adjusted under 35 U.S.C. 154(b) by 0 days.

(21) Appl. No.: 13/193,889

(22) Filed: Jul. 29, 2011

(65) Prior Publication Data
US 2013/0031470 A1    Jan. 31, 2013

(51) Int. Cl.
| | | |
|---|---|---|
| G06F 17/00 | (2006.01) | |
| G06F 17/30 | (2006.01) | |
| G06Q 30/02 | (2012.01) | |
| G06F 17/21 | (2006.01) | |

(52) U.S. Cl.
CPC ...... *G06F 17/30893* (2013.01); *G06F 17/211* (2013.01); *G06F 17/30867* (2013.01); *G06F 17/30905* (2013.01); *G06Q 30/0251* (2013.01); *G06Q 30/0277* (2013.01)

(58) Field of Classification Search
None
See application file for complete search history.

(56) References Cited

U.S. PATENT DOCUMENTS

| | | | | |
|---|---|---|---|---|
| 5,991,735 A * | 11/1999 | Gerace | .................. | G06Q 30/02 705/7.29 |
| 6,182,097 B1 * | 1/2001 | Hansen | ................. | G06F 11/323 707/999.003 |
| 6,300,947 B1 * | 10/2001 | Kanevsky | ......... | G06F 17/30905 707/E17.121 |
| 6,470,383 B1 * | 10/2002 | Leshem | .................. | G06F 11/32 707/E17.116 |
| 6,631,372 B1 * | 10/2003 | Graham | ............ | G06F 17/30864 705/26.8 |
| 6,714,975 B1 * | 3/2004 | Aggarwal | .............. | G06Q 30/02 705/14.43 |
| 6,907,566 B1 * | 6/2005 | McElfresh | ............. | G06Q 30/02 705/14.43 |
| 7,185,280 B2 * | 2/2007 | Deganello | ............. | G06F 17/248 715/243 |
| 7,581,173 B1 * | 8/2009 | Ferguson | .......... | G06F 17/30899 715/235 |
| 7,747,749 B1 * | 6/2010 | Erikson | ............ | G06F 17/30902 709/219 |
| 7,944,456 B2 * | 5/2011 | Seljavaara | ........ | G06F 17/30905 345/660 |
| 8,015,491 B2 * | 9/2011 | Shaver | ................ | G06F 17/3089 715/716 |
| 8,037,409 B2 * | 10/2011 | Jacob | .................. | G06F 17/3089 715/243 |

(Continued)

*Primary Examiner* — Scott Baderman
*Assistant Examiner* — Benjamin J Smith
(74) *Attorney, Agent, or Firm* — Pillsbury Winthrop Shaw Pittman LLP

(57) ABSTRACT

Method and system for generating personalizing website layout. The method and system monitors a user's behaviors and assigns a user to a user group, which has an assigned personalized template. The templates are personalized in response to the user's behaviors and arranges content to be displayed to the user based on that behavior.

24 Claims, 9 Drawing Sheets

(56) References Cited

U.S. PATENT DOCUMENTS

| | | | | |
|---|---|---|---|---|
| 8,073,866 B2* | 12/2011 | Eagle | G06F 17/30867 | 707/706 |
| 8,103,961 B2* | 1/2012 | Bushey | G06Q 20/1085 | 705/43 |
| 8,346,782 B2* | 1/2013 | Zhang | G06F 17/30867 | 707/748 |
| 8,386,915 B2* | 2/2013 | Howes | G06F 17/30896 | 715/205 |
| 8,543,900 B1* | 9/2013 | Kent | H04L 67/22 | 705/14.43 |
| 8,544,039 B2* | 9/2013 | Chang | G06Q 30/02 | 703/23 |
| 8,561,184 B1* | 10/2013 | Marsa | H04L 67/22 | 726/22 |
| 8,577,181 B1* | 11/2013 | Badros | G06Q 30/0277 | 345/660 |
| 8,612,892 B2* | 12/2013 | Danton | G06F 3/04886 | 715/245 |
| 8,650,265 B2* | 2/2014 | Broder | G06Q 30/02 | 705/14.42 |
| 8,732,569 B2* | 5/2014 | Burkard | G06F 17/30902 | 715/206 |
| 8,775,275 B1* | 7/2014 | Pope | G06Q 30/0641 | 705/14.49 |
| 8,839,093 B1* | 9/2014 | Siroker | G06F 17/3089 | 715/234 |
| 8,850,305 B1* | 9/2014 | Kent | G06F 17/30867 | 382/181 |
| 8,898,560 B1* | 11/2014 | Kent | G06F 17/30905 | 705/14.43 |
| 8,930,818 B2* | 1/2015 | Cordasco | G06F 11/328 | 715/704 |
| 9,003,015 B2* | 4/2015 | Seifert | G06F 17/30861 | 709/221 |
| 2002/0165955 A1 | 11/2002 | Johnson | G06F 17/3089 | 709/224 |
| 2005/0027594 A1* | 2/2005 | Yasnovsky | G06Q 30/02 | 705/14.55 |
| 2005/0125725 A1* | 6/2005 | Gatt | G06F 17/3089 | 715/243 |
| 2005/0172226 A1* | 8/2005 | Kobashi | G06F 17/211 | 715/246 |
| 2006/0015614 A1* | 1/2006 | Johnson | G06F 17/3089 | 709/224 |
| 2006/0020510 A1* | 1/2006 | Vest | G06Q 30/02 | 705/14.52 |
| 2006/0253327 A1* | 11/2006 | Morris | G06Q 30/02 | 705/14.42 |
| 2006/0294199 A1* | 12/2006 | Bertholf | G06F 17/30893 | 709/217 |
| 2007/0136682 A1* | 6/2007 | Stienhans | G06F 9/451 | 715/789 |
| 2007/0168425 A1* | 7/2007 | Morotomi | H04M 1/72522 | 709/204 |
| 2007/0180469 A1* | 8/2007 | Finley | G06Q 30/02 | 725/46 |
| 2007/0208729 A1* | 9/2007 | Martino | G06F 17/30702 | |
| 2007/0209005 A1* | 9/2007 | Shaver | G06F 17/3089 | 715/733 |
| 2007/0250467 A1* | 10/2007 | Mesnik | G06F 17/3089 | |
| 2008/0027830 A1* | 1/2008 | Johnson | G06F 17/3089 | 705/14.68 |
| 2008/0046562 A1* | 2/2008 | Butler | G06F 17/3089 | 709/224 |
| 2008/0086558 A1* | 4/2008 | Bahadori | G06F 11/3438 | 709/224 |
| 2008/0148145 A1* | 6/2008 | Jacob | G06F 17/3089 | 715/243 |
| 2008/0183672 A1* | 7/2008 | Canon | G06F 17/30905 | |
| 2008/0195575 A1* | 8/2008 | Schiffler | G06F 17/30867 | |
| 2008/0201206 A1* | 8/2008 | Pokorney | G06F 17/30867 | 705/7.29 |
| 2008/0201220 A1* | 8/2008 | Broder | G06Q 30/02 | 705/14.56 |
| 2008/0209320 A1* | 8/2008 | Mawhinney | G06F 17/30905 | 715/700 |
| 2008/0256064 A1* | 10/2008 | Grois | G06Q 30/02 | |
| 2008/0275980 A1* | 11/2008 | Hansen | G06Q 30/02 | 709/224 |
| 2008/0313040 A1* | 12/2008 | Rose | G06Q 30/02 | 705/14.69 |
| 2008/0316228 A1* | 12/2008 | Seljavaara | G06F 17/30905 | 345/660 |
| 2008/0320124 A1* | 12/2008 | Lee | G06F 17/3089 | 709/224 |
| 2009/0037809 A1* | 2/2009 | Baer | G06Q 30/02 | 715/243 |
| 2009/0037914 A1* | 2/2009 | Chagoly | G06F 11/3006 | 718/101 |
| 2009/0063249 A1* | 3/2009 | Tomlin | G06Q 30/02 | 705/7.34 |
| 2009/0089151 A1* | 4/2009 | Protheroe | G06Q 10/00 | 705/14.69 |
| 2009/0172161 A1* | 7/2009 | Singh | G06F 17/3089 | 709/225 |
| 2009/0172551 A1* | 7/2009 | Kane | G06Q 30/02 | 715/733 |
| 2009/0172562 A1* | 7/2009 | Lai | G06F 3/04817 | 715/745 |
| 2009/0182643 A1* | 7/2009 | Holstein | G06Q 30/02 | 705/26.1 |
| 2009/0216616 A1* | 8/2009 | Wang | G06Q 30/02 | 705/14.53 |
| 2009/0222737 A1* | 9/2009 | Liesche | G06F 17/30873 | 715/738 |
| 2009/0248655 A1* | 10/2009 | Makeev | G06F 17/30864 | |
| 2009/0299862 A1* | 12/2009 | Fan | G06Q 30/02 | 705/14.73 |
| 2009/0327424 A1* | 12/2009 | Bernstein | G06Q 10/06 | 709/205 |
| 2009/0327869 A1* | 12/2009 | Fan | G06Q 30/02 | 715/240 |
| 2010/0017704 A1* | 1/2010 | Jaffe | G06F 17/30867 | 715/243 |
| 2010/0042419 A1* | 2/2010 | Pritchard | G06Q 30/02 | 705/14.4 |
| 2010/0058383 A1* | 3/2010 | Chang | G06Q 30/02 | 725/35 |
| 2010/0082427 A1* | 4/2010 | Burgener | G06Q 30/02 | 705/14.49 |
| 2010/0169792 A1* | 7/2010 | Ascar | G06F 11/3414 | 715/744 |
| 2010/0185726 A1* | 7/2010 | Kedem | G06Q 30/02 | 709/203 |
| 2010/0191727 A1* | 7/2010 | Malik | G06F 3/013 | 707/734 |
| 2010/0218112 A1* | 8/2010 | Park | G06Q 30/02 | 715/745 |
| 2010/0251128 A1* | 9/2010 | Cordasco | G06F 11/328 | 715/736 |
| 2011/0022963 A1* | 1/2011 | Bushey | G06F 8/38 | 715/745 |
| 2011/0035263 A1* | 2/2011 | Ramanathan | G06F 3/0485 | 705/14.4 |
| 2011/0041168 A1* | 2/2011 | Murray | G06Q 30/02 | 726/7 |
| 2011/0087966 A1* | 4/2011 | Leviathan | G06F 17/30905 | 715/745 |
| 2011/0125593 A1* | 5/2011 | Wright | G06Q 30/02 | 705/14.73 |
| 2011/0202522 A1* | 8/2011 | Ciemiewicz | G06F 17/30867 | 707/711 |
| 2011/0261049 A1* | 10/2011 | Cardno | G06Q 10/10 | 345/419 |
| 2011/0302025 A1* | 12/2011 | Hsiao | G06Q 30/02 | 705/14.42 |
| 2012/0101907 A1* | 4/2012 | Dodda | G06Q 30/0277 | 705/14.73 |

(56) References Cited

U.S. PATENT DOCUMENTS

| | | | |
|---|---|---|---|
| 2012/0102391 A1* | 4/2012 | Lee | G06F 17/227 715/235 |
| 2012/0137201 A1* | 5/2012 | White | G06F 17/30899 715/205 |
| 2012/0140255 A1* | 6/2012 | Tanaka | G06F 9/445 358/1.13 |
| 2012/0143816 A1* | 6/2012 | Zhang | G06F 17/30867 707/607 |
| 2012/0144327 A1* | 6/2012 | Johnson | G06F 3/0486 715/763 |
| 2012/0158950 A1* | 6/2012 | Seifert | G06F 17/30861 709/224 |
| 2012/0203640 A1* | 8/2012 | Karmarkar | G06F 1/1686 705/14.66 |
| 2012/0239489 A1* | 9/2012 | Peretti | G06Q 30/02 705/14.45 |
| 2012/0254149 A1* | 10/2012 | Ramsay | G06Q 30/0256 707/709 |
| 2012/0330922 A1* | 12/2012 | Kong | G06F 17/30864 707/709 |
| 2013/0073945 A1* | 3/2013 | Bingell | G06F 17/30905 715/234 |
| 2013/0080910 A1* | 3/2013 | Bingell | G06F 3/048 715/744 |
| 2014/0114761 A1* | 4/2014 | Lee | G06Q 30/0241 705/14.54 |

* cited by examiner

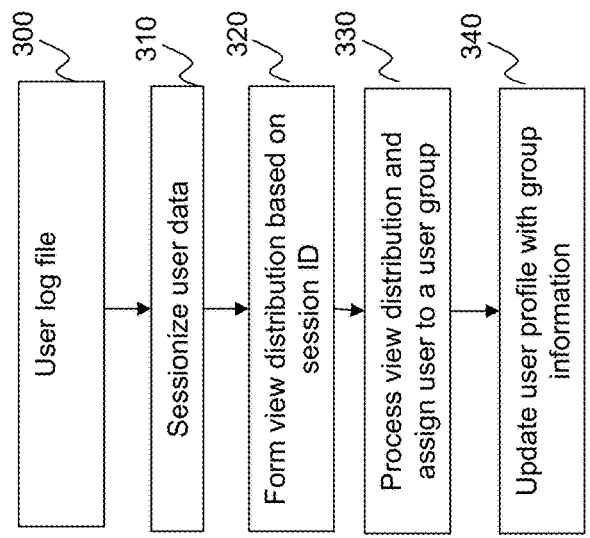

METHOD AND SYSTEM FOR PERSONALIZING WEB PAGE LAYOUT

BACKGROUND

1. Technical Field

The present teaching relates to methods, systems and programming for providing personalized web page layouts.

2. Discussion of Technical Background

The tremendous advancement in the world of the Internet has made it possible for a user to electronically access virtually any content. With the explosion of information, it has become more and more challenging to find desired information and to present it to a user in a way that is engaging, easy, and useful. For example, a user may search desired content via a search engine by specifying a query which usually includes one or more keywords. A search is returned, and the user is presented with information arranged in a standard configuration regardless of the user's specific interests, habits and behaviors. On many occasions, what a user desires is more than a simple list of individual and stand alone pieces of information that a conventional search engine typically returns. Accordingly, topical portals have developed that are more topic oriented then traditional search engines, and allow users to access information based on subject matter rather than simple searches. Portals on finance, sports, news, weather, shopping, music, art, film, etc., exist and are used by many users. For example, a user may be interested in specific pieces of financial information related to a specific company and would like all the relevant information related to that company or stock to be easily accessible and logically placed in a single location. Rather than simply searching in a search engine, a user may begin their search from a portal page, such as Yahoo® Finance. A typical portal page, such as Yahoo® Finance, will present the user with a layout of content modules prearranged in a set order. The modules of the page are related and arranged in a preset order, regardless of the user's identity, preferences, or behaviors. Furthermore, due to the number of users accessing information on the internet, it is crucial to users and service providers to be able to allow users to find the information they seek in a quick, efficient manner. For example, if a user has to scroll down on the screen to reach an area of a web page before clicking on that area, the user has wasted time, and the content provider has tied up valuable resources during that period that could otherwise be used servicing the user better or servicing other users.

Personalized page layout increases the user's engagement with the site and makes web sites more popular. It makes advertising more effective by presenting content to users in a more appealing and targeted manner. Accordingly, given the amount of information available to users, and the differences among users, there is a need for organizing and presenting content on a web page to a user in a personalized manner, so that it is more appealing, more effective, and more efficient for a user to navigate and find the desired information.

SUMMARY

The teachings disclosed herein relate to methods, systems, and programming for providing personalized web page layouts.

The present disclosure relates to providing personalized web page layout. The present disclosure is not directed at personalizing the content selected to be displayed, but to personalize the way the content is displayed for each user or user group. Web pages are typically made up of a series of content modules that are arranged to be displayed on a user's display in a specific configuration. The present disclosure discloses a method, system, and programming for dynamically changing that arrangement for a user based on characteristics specific to that user, such that different users may receive the same content on a web page, but it will be arranged differently for each user or user group.

In one example, a method, implemented on a machine having at least one processor, storage, and a communication platform connected to a network for generating personalized content layout, is disclosed. The user's web browsing activities are monitored via the communication platform. The user is assigned to a user group based on the monitored activities. A layout template for the user based on the user group assignment is selected. A plurality of pieces of content according to the layout template are arranged, and the arranged plurality of pieces of content are displayed to the user.

In another example, the selecting of the layout template is performed by a template generator running on a processor. In another example, the monitoring of web browser activities includes monitoring at least one of the following user behaviors: web site visits, content selection, user profile data, book marks, module selections, radio button selections, module controls, module players, widget controllers, inputting data to online forums, text messaging, updating social network status, page dwell times and scroll rates, browser software version and plug-ins (extensions) available, network connection latency and bandwidth.

In still another example the user's display is updated and the plurality of pieces of content shown to the user are rearranged when a user's assignment to a user group is changed, and when assigning the user to a different group.

In another example, a method implemented on a machine having at least one processor, storage, and a communication platform connected to a network for a search engine is disclosed. In the example, a clustering engine running on one of the processors of the machine analyzes a plurality of user identifiers to cluster one or more users into a user group. The template generation engine running on the processor of the machine generates a display template for displaying a plurality of content to one or more users of a user group. The plurality of pieces of content are displayed to one or more users according to the template generated.

In still another example, the user is reassigned to a second user group, a second template, based on the reassignment, is generated, and the user's display of the plurality of pieces of content is updated based on the second template. In a further example, the display template is generated based on which group the user is assigned. In still another example, the generating includes selecting a template from a template library based on a certain criterion appropriate to the user group. In another example, the reassignment is based on online user feedback.

In another example, a system for generating personalized layout is disclosed. The system includes an assignment generator for assigning a user to a user group based on information related to the user. A template generator configured for generating a layout template based on the user's group assignment, and a communication platform for presenting a plurality of pieces of content to the user based on the layout template.

In a further example, the layout template comprises a specification of the layout of pieces of content to be arranged within the layout template. In one more example, a classifier module for reassigning a user to a second user group is implemented. The classifier module utilizes a learning mechanism to determine the second user group based on online behaviors.

In an example, a method for personalizing the layout of a web page is disclosed. The method includes assigning a plurality of users to a plurality of user groups. Assigning a personalized layout template to each of the plurality of user groups. Arranging a plurality pieces of content according to the personalized layout template for a user from each of the user groups and displaying the plurality pieces of content to a user of each user group according to the arrangement corresponding to the user group, where, the plurality pieces of content for all the user groups are the same.

In a further example, the plurality of users are reclassified, the plurality of users are reassigned to different user groups having different layout templates based on the reclassification. And, the layout of the plurality of content for each reassignment based on the different layout templates is reassigned. The assigning of the personalized layout template to each of the plurality of user groups is based on at least one of the following: user interests, user behavior, advertisement placement, paid for content placement, and media type placement, content availability and features of the content that is available, performance of previous template assignments.

In another example, the method includes determining statistics associated with the plurality of users in each user group. Updating a record associated with a content provider in connection with the one or more layout templates based on the statistics. Receiving a payment made in association with the one or more layout templates and computed based on the record.

A system for a search engine, is disclosed in an example, utilizing a personalized template generator configured for generating a personalized template for a user based on a behavior of the user A platform configured for interfacing with the user and an analyzer configured for analyzing the user's behavior and a content search platform configured for searching one or more pieces of content based on a query, and displaying the one or more pieces of content to the user arranged based on the personalized template. An example of a further system comprises a user classifier to classify the user to a user group, wherein the user shares the user's behavior with a plurality of users assigned to the user group.

An example of a machine readable non-transitory and tangible medium having information recorded thereon for personalized templates, wherein the information, when read by the machine, causes the machine to perform the following is disclosed. Monitoring a user's web browsing activities, via a communication platform. Assigning a user to a user group based on the monitored activities. Selecting a layout template for the user based on the user group assignment. Arranging a plurality of pieces of content according to the layout template, and displaying the arranged plurality of pieces of content to the user. In another example, the information, when read by the machine, further causes the machine to determine statistics associated with a user group, update a record associated with a content provider in connection with the one or more layout templates based on the statistics, and receive a payment made in association with the one or more layout templates and computed based on the record.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3 depicts a flowchart of the preprocessing step in an embodiment of the present disclosure;

FIG. 4 depicts an exemplary data structure in an embodiment of the present disclosure;

DETAILED DESCRIPTION

Figure 1:
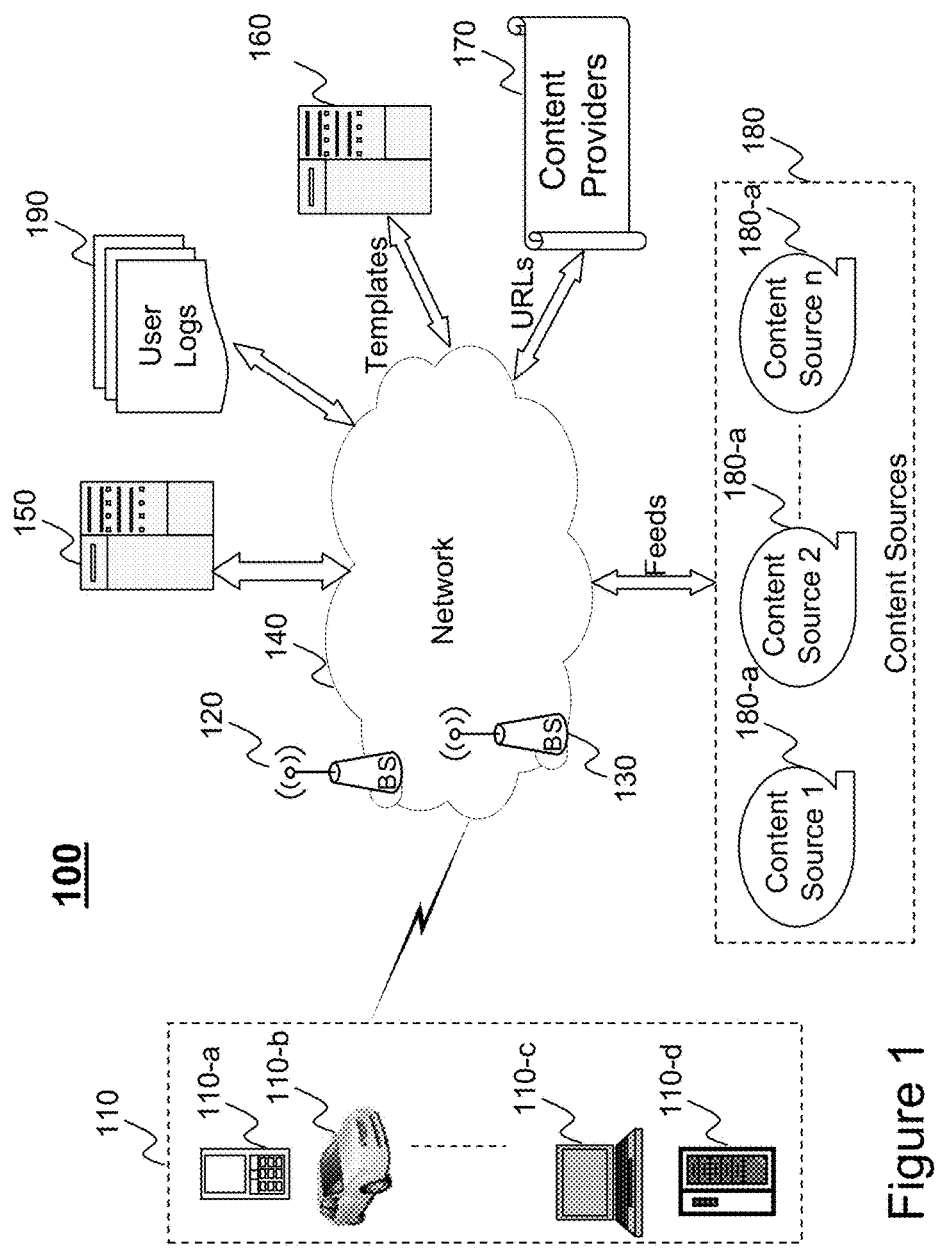
FIG. 1 depicts an exemplary architecture of a system in which personalized layouts can be generated and made subsequently accessible to users.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to displaying information or content to a user of a web site in such a way that it is personalized to that user. The arrangement of multiple pieces of information or content modules are in accordance with a personalized template, which is created consistent with the user's current and past behaviors and interests. The content to be included in a personalized web page may be a piece of text, a locator such as a URL, a map, an image, an animation, a piece of audio or a video clip that can be played back, a message, or any combination thereof.

The template may be determined or created based on a user's interests, profile data, user provided data, search behaviors, search history, click history, book marking activities, relation to other users, or any other information learned about the user during interactions on the computer. A user's profile may be simple, i.e., the user visits sports web sites, or highly complex, based on known techniques, i.e., search queries, web sites visited, purchases, social networks, or even other non-web based applications. Templates may be created by a template generator engine or may be selected from a library of templates that were previously generated by template generators or individual template designers. Templates as used herein includes other attributes and is not restricted to the arrangement of the content modules or placement, but may denote other personalized display characteristics, such as colors, fonts, borders, headings, etc.

In an embodiment, a user is assigned a template based on the user's assignment to a user group, although assignments may be carried out based on an individual's user profile and not group assignment as well. In such an embodiment, a user with a similar user profile may be assigned to a user group that has a template pre-assigned to that user group. Additionally, or alternatively, a template may be generated for a user group dynamically, as the user group's preferences or requirements change. Additionally, or alternatively, a user may be reassigned from a first user group with a defined template assignment to a second user group with a different assigned template. Such reassignment may occur dynamically, while a user is actively engaged in internet browsing or searching or may happen off-line at a preset time or other triggering event such as a change in content availability or in the assignment of related user. In the off-line instance, the user will not perceive the change immediately, but will encounter the new template the next time he or she interacts with the web browser. In another embodiment, a user may select certain attributes of the template, such as color or font. The use of known machine learning techniques such as clustering and Bayesian classification enables the system to work on a large commercial scale.

In an embodiment, the user's log files are analyzed to determine the user's interest. If enough history about a user is available, a user may be assigned to a user group based on the log files. Once assigned to a user group, a template generator may assign the user a template based on the current user group assignment. Additionally, or alternatively, a user may be assigned a template from a library of templates.

In an embodiment, analysis of a user's log files may require some additional preprocessing before the log files are analyzed for use of personalized layout. This may be accomplished by analyzing historical user log data. User identifiers typically contain data about the user or more specifically, about the user's search and click history. For example, a typical log file may contain identifiers such as a user id or browser cookie, the URL that the user clicked on or visited, a time stamp, the length of time on a visited URL, and a region, module or space_id that the user clicked on the web site.

The preprocessing steps in assigning a personalized template in an embodiment, includes, sessionizing a user's search log files. This may be accomplished by assigning a unique session identifier to a log record for the same user that correspond to the same session. A session may be a period of time, such as 15 minutes between clicks, although other longer or shorter session times may be utilized. In an embodiment, a heuristic approach may be utilized to define the session, and all web pages viewed within that session period are grouped together to form a view distribution for a session. A view distribution is a list of numbers or data that correspond to the number of times a user viewed a certain area or region of a page or module on a website. This is accomplished by analyzing the space_id's (the modules visited or the area of the page interacted with) for each user.

Once view distributions are created for a series of users, clustering algorithms, such as K-means, partitional, density-based, subspace, hierarchical, or other clustering methods may be used to group users that have similar view distributions and other similar attributes together to form a group. It will be appreciated by those skilled in the art, that depending on the clustering algorithm utilized, the number of groups may be dynamic or predetermined, such as in the case of K means clustering. In an embodiment, K-means clustering was implemented, although other methods, such as those listed here may also be used.

For each of the groups, a personalized layout or template is assigned based on the group's historical behaviors. The templates may be created by a template generator engine or may be designed ahead of time, but in either case, layout and space on the template is prioritized to correspond to the page modules or regions that received the most views in the view distribution for that group. In an embodiment, that layout consists of the selected template that specifies where on the page content should be placed and a set of operational modules that retrieve the content and render it into the template. It should be understood, that this only applies where a user has user logs associated with prior activities, such that an initial group assignment and the accompanying template may be determined.

In an embodiment, where the user did not have sufficient log files to assign the user to a group, the user was assigned to a null group or random group with an associated null or random template assignment, until such time as a new group determination could be achieved.

In an embodiment, after a user is assigned to a group, and its associated template based on log file analysis, the user's live interactions are monitored to determine if the user's template should be updated and the user assigned to a new group based on the live interactions. Updating the template may be triggered based on a detection of a change in the user's behavior. To detect such a change, dynamic information may be gathered and analyzed over time to see whether the collected information indicates a change. Some changes can be recognized as meaningful upon detection, e.g., a user's input. Some changes may not clearly signal significance in individual instances but cumulatively, they may. For example, individual clicks from a user on a particular URL link or module may not mean much but repeated clicks on the same URL or module may indicate that the content associated with the URL or module may need to become the focal point of the template if it has not already been.

In an embodiment, a machine learned classifier is used to assign users to a group while they are browsing a web site. The new assignment may happen immediately on the first page view or it could take several clicks to make a new determination. The machine learned classifier may be trained using the output of the clustering step. In an embodiment, a Bayesian classifier was utilized, but other standard machine learned classification techniques such as support vector machines, conditional random fields, or decision trees could be used as well. After the user has been assigned to the new group, the group's customized template is used to produce personalized layout of the subsequent pages requested by the user.

The personalized templates may include both content from a static source (static content) or content from an active source (active content). Examples of static sources may include the headline stories from CNN.com or an article on a particular subject published on a web site. Although static content may correspond to the most updated content from a certain source at the time of the access, once it is rendered in the template, it is not dynamically updated during the same viewing session. Active content likely needs to be dynamically updated even within the same viewing session. Examples of active content include but are not limited to stock price quotes, online chat, twitter, or other updates.

Both the underlying topic and a focal point of the group may affect the creation of a template that governs the personalization. A template includes multiple pieces of content that are to be used to compose a web page and a spatial arrangement (or layout) of the multiple pieces of content. Content is determined with respect to the underlying topic of interest and the focal point of the user group. Whenever there is a change in the topic or focal point associated with an existing group or user, a new template may be adapted to such a change. On the personalized template, financial modules, articles, advertisements, or URLs linked to web pages of different content sources may be composed together to provide focused information to the user. For instance, if a user is interested in a specific stock's performance and any news associated with the stock, the personalized template may be used to meet the user's needs by associating a stock ticker as an initial focal point and placing financial news feeds in close proximity. If, however, the user's behavior indicates that the user is more interested in world news then financial news, a template may be used that moves the financial news module to a less predominant spot on the page and places the world news module closer to the stock ticker module. In this case, the focal point of the underlying template may be altered and the new focal point may lead to changes in the personalized layout. Due to the personalization of the template, each time a user exhibits interests worthy of a change, the template may be updated such that the focal point needs to be adapted.

Other concepts relate to unique software for implementing the one or more of personalized template or layout generation techniques. A software product, in accord with this concept, includes at least one machine-readable medium and information carried by the medium. The information carried by the medium may be executable program code regarding assigning users to groups, generating personalized templates, and in some cases dynamically updating the templates when necessary.

Additional novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

FIG. 1 is an exemplary architecture of a system 100 in which personalized templates can be generated and made subsequently accessible to users, according to an embodiment of the present teaching. In system 100, users' devices, shown at 110, are connected to other networked components through a wireless and/or landline network 140. In the system 100, the network 140 also provides communication connectivity to various content providers 170, content feed sources 180, a search engine 150, and a template generation engine 160. In this example, the content providers 170, the content feed sources 180, and the template generation engine 160 are capable of creating, selecting, and directly providing content to users 110 via the network 140. Content may also be provided to the users 110 via the search engine 150, which gathers and collects information, from the content providers 170, the content feed sources 180, and the template generation engine 160 and delivers such information to the users 110. Users 110 may request or access content via different platforms offered on their respective access devices such as a handheld device 110-a, a communication platform installed in a mobile vehicle 110-b, or a browser or other access platform implemented on a computer such as a laptop 110-c or a desktop computer 110-d.

The network 140 can be a single network or a combination of different networks, which can be a local area network (LAN), a wide area network (WAN), a public network, a private network, a proprietary network, a Public Telephone Switched Network (PSTN), the Internet, a wireless network, a virtual network, or any combination thereof. The network 140 may also include various network access points, such as wired or wireless access points such as base stations 120 and 130 or Internet exchange points, through which a user can connect to the network in order to reach other parties connected therewith.

In the system 100, the users 110 may request or obtain content either directly from content sources where content is generated or created or via the search engine 150 that can assist a user to identify a selectable subset of available content based on, for example, a query or other information associated with the query or the user. In the context of web content, a user can access content in different forms. For instance, a user may access a piece of content via a locator such as a URL that represents the content such as content from the content providers 170. A user may also receive content itself directly, for example, through feed sources such as 180-a, 180-b, . . . , 180-c or from a content provider 170. Irrespective of the content's source, the content layout may be formatted to adhere to a personalized template selected or generated by template generation engine 160.

Traditionally, requested content is delivered in a predetermined arrangement or a relative relationship with respect to other content. In accordance with the present teaching, however, the template generation engine 160 is provided to customize templates that conform to a user's preferences. Additionally or alternatively, the template generation engine 160 may not be a content provider. Rather, the template generation engine 160 creates personalized templates and rearranges the different pieces of content, based on a user or user groups past behaviors. Additionally or alternatively. The template generation engine 160 may be operated by, or associated with search engine 150, content provider 170 or any other unrelated third-party.

The template generation engine 160 may operate in different modes. It may store predefined templates that have been previously created either by a template designer based on specific historical criteria or that have been automatically generated based on historical criteria. Such templates typically may be generated off line and stored for future use. Additionally, and alternatively, template generator 160 may store templates it creates on its own based on active user or user group behaviors. Such templates will typically be generated for use during the active user session. In either case, there is an unlimited number of templates that may be generated and/or stored within template generator 160 and the number is only limited by the resources allocated to template generator 160. All generated templates, regardless of how they are created are indexed for subsequent use by a user or user group.

In system 100, the template generation engine 160 may relate to other parties (e.g., users 110, search engine 150, content provider 170, etc.) in different ways. For instance, the template generation engine 160 may operate independently as a standalone service. In this mode, the template generation engine 160 may be capable of directly interacting with users and providing personalized templates, either previously generated or generated on-the-fly, to users based on their needs.

In some examples, the template generation engine 160 may be affiliated with one or more other parties, e.g., the operator of the search engine 150, to supply personalized templates to its users. In this mode of operation, the template generation engine 160 will not interact directly with users but rather work as, for example, a backend of the affiliated parties to generate and provide personalized templates to meet their user's needs. In this case, the template generation engine 160 may receive a request from equipment of an affiliated party with associated information related to the template to be generated.

The template generation engine 160 may also be an integral part of equipment of another party. For example, although shown separately, the template generation engine 160 may be a part of the search engine 150. In such a case, the search engine such as 150 may respond to a query by searching the network for appropriate content (traditionally done) and execute an associated generation routine for creating the personalized template that has a different focal point for the user's group. Similarly, in some examples, the template generation engine 160 may also be either affiliated with or an integral part of one or more content providers.

Figure 2:
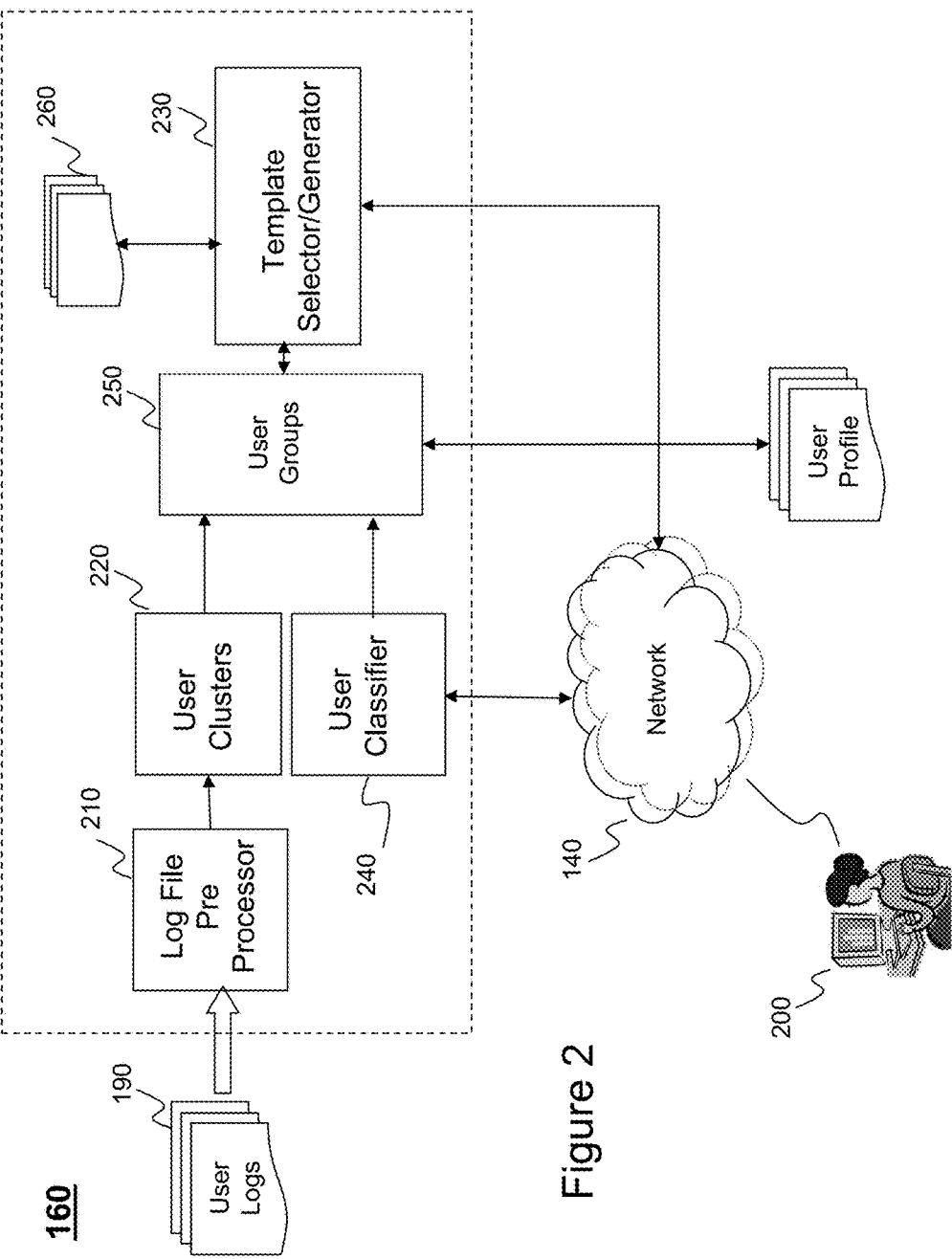
FIG. 2 depicts a block diagram of an exemplary template generator in an embodiment.

FIG. 2 is a functional block system diagram, including elements of an example of the template generation engine 160, in a networked environment. The exemplary template generation engine 160 includes a log file pre processor 210, user clusters 220, template generator 230, a user classifier 240 and a user groups log 250. Optionally, the template generation engine 160 may also include a database of stored templates 260 which stores the previously created templates. As shown in FIG. 2, the template generation engine 160 may use user logs 190 to preprocess and generate user clusters 220 and user groups 250 on which to base the template selection. Similarly, template generation engine 160 may use a machine learned user classifier 240, to assign or reassign, as the case may be, a user to a new user group which may or may not have a new template assigned by template generator 230. In either case, a template from the stored templates database 260 may be selected based on the assigned/associated user group.

User classifier 240 may be a machine learner classifier that assigns users to groups based on online adaptive optimization. That is, it occurs at the same time as other related events are still occurring, i.e., the update of the user's group assignment occurs concurrently with the user's interaction with the site. User classifier 240 may be a Bayesian classier, or another machine learned classifier, such as a support vector machine, conditional random fields, or decision tree-based classifier.

In an embodiment, initially a user that has not previously been assigned to a user group will be assigned a null template or random template by template generator 230. The null or random template may be a default template applied to every similarly unassigned user or it may be a randomly assigned template. As the user continues to interact with various web pages and modules on each page, the user logs 190 continue to gather and record the user's interactions. In an embodiment, the user originally assigned to the null template will retain that template assignment during the entire session. During the session, data will be stored in user logs 190 for later analysis. Additionally or alternatively, a user may be assigned a different template during the initial session based on information from user classifier 240.

FIG. 3 depicts the steps of log file pre-processor 210. FIG. 4 depicts a typical data structure found in a user log 190 of the present disclosure. At step 300, a user log file is extracted from user log files 190. The user log contains such information as user_410, URL 420, space_ID 430, time stamp 440, and other user information, such as referring URL 460, user demographic data 470 (such as age and gender), the user group 480 that the user was assigned to at the time of the logged event, as well as any context 490, such as the page layout used at that time. User_Id 410 may be obtained from the user's profile or from a user cookie associated with the user. URL 420 represents the web page or module visited, space_ID 430 represents the area, region, or module that the user is clicking on or viewing within the viewed web page, time 440 depicts a time stamp for the user's activity, and session_ID 450 is used to identify which sites or modules a user visited during a particular viewing session.

At step 310, the user data is sessionized and session_ID 450 is added to the log files for the user. The session_ID 450 corresponds to the web sites and modules that the user viewed or clicked on during a particular session. A session may be a predetermined period of time or may be based on a variable limit such as time between clicks. In an embodiment, 15 minutes between clicks was used as the limiting factor to define a session, although other longer or shorter session times may be utilized. In an embodiment, a heuristic approach may be utilized to sessionize the data and define the session, e.g., the session continues as long as the user makes a click within a defined time window. Other sessionizing approaches such as the use of entry and exit pages, or a maximum time between clicks may also be used. Utilizing time 440 to determine if the user is still within the same session, all the web pages viewed within a session are grouped together to form a view distribution at step 320. The view distribution formed at step 320 is a list of numbers or data that correspond to the number of times a user viewed a certain area or region of a page or module on a web page. At step 330, the view distribution is analyzed utilizing a clustering algorithm to determine, based on the URLs 420 and space_IDs 430, where the user visited or clicked on during a session which user group to assign the user. In an embodiment, a K-means clustering algorithm, with a predetermined number of groups was used to process the log files, but other clustering algorithms, such as hierarchical clustering and support vector machines may also be used. At step 340, the user's profile is updated with the assigned user group information. The user profile may be a user cookie, or may be a separate file maintained in the user log files.

Once a user is assigned a user group 250 they may remain in that group for the present session or until the user's behaviors change. In either event, a user that has been assigned to a user group, may be reassigned to a different group using user classifier 240 at some later time.

Figure 5:
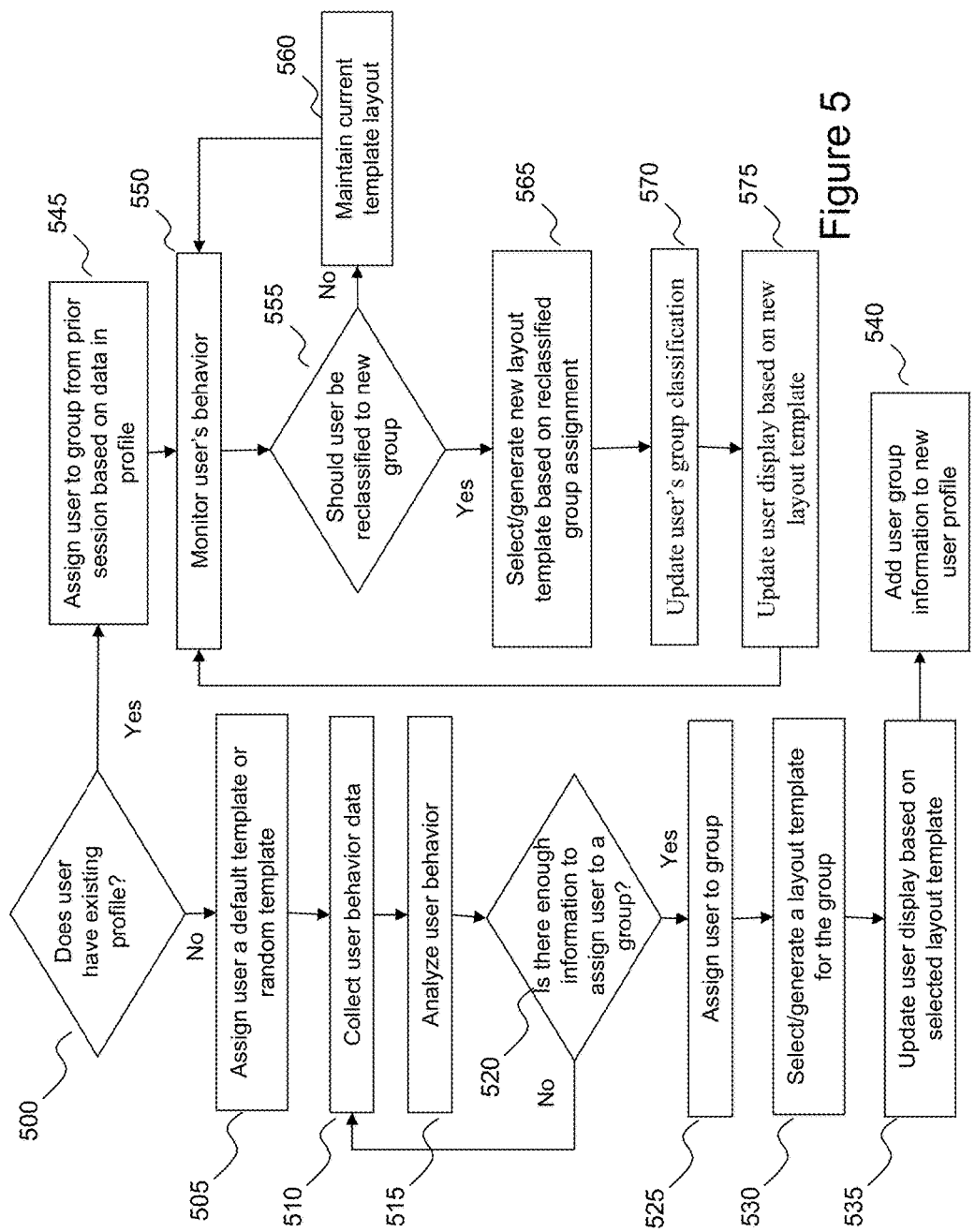
FIG. 5 depicts a flow diagram in accordance with an embodiment of the present disclosure.

FIG. 5 depicts the process for a user assigning, reassigning and monitoring a user or for handling a user that may not have a previously established user profile. At step 500, template generation engine 160 determines if the user has an existing profile by checking user log 190. If no profile exists, the user is assigned to a default template and may be assigned to a null user group. Additionally or alternatively, the user may be randomly assigned to a user group and or randomly assigned a template until template generation engine 160 has enough information about the user to make a determination regarding an appropriate user group and template. At 510, template generation engine 160 collects user data, such as modules selected, modules viewed, time between module selection, module selection a then b, or time spent interacting with a module (such as watching a video or scrolling through a list). The collected data is analyzed at step 515 by template generation engine 160, and a determination is made at step 520 to determine if there is enough information known about the user's behavior to assign the user to a user group. If template generation engine 160 has enough information in the user's habits, it assigns the user to a user group using classifier 240. Template generation engine 160 will then select or generate a layout template at step 530 using template generator 230, for the user to utilize and may update the user's display at step 535. Alternatively, the template generation engine 160 may allow the user to continue using the current template and will not update the user's display until some future triggering event, such as at a next login, next day, next session, or a change in context such as when the user has moved on to a new task or the content available has significantly shifted. Finally, at step 540, the user's profile is updated in user log files 190 to indicate the user group for the user.

If it is determined at step 500 that the user has an existing profile, template generation engine 160 will assign the user to the user group defined in the user's profile at step 545 after preprocessing is complete. At step 550, template generation engine 160 monitors the user's current behavior to determine if the user should be reclassified and assigned to a new user group. If it is determined that the user's current behavior is consistent with the currently assigned user group, then no action is taken and the current template and user group assignment are maintained in step 560. If however, it is determined at step 555 that the user's current behavior warrants a reclassification of the user to a new user group, or if the template is no longer relevant to that specific user group, then template generation engine 160 will reclassify the user or group utilizing user classifier 230 and select and/or generate a new template utilizing generator 230 and update the user's group in 250. Reclassification may occur at the same time other related events are still occurring, i.e., the update of the user's group assignment occurs concurrently with the user's interaction with the site. Once updated, template generation engine 160 will continue to monitor the user's behavior to determine if further updates are required. As with the case of a new user, an existing user's template at step 575 may update immediately or may update upon a subsequent triggering event such as next login, next search, next, browser session.

Figure 6A:
FIG. 6(a) depicts an exemplary web site display.
Figure 6B:
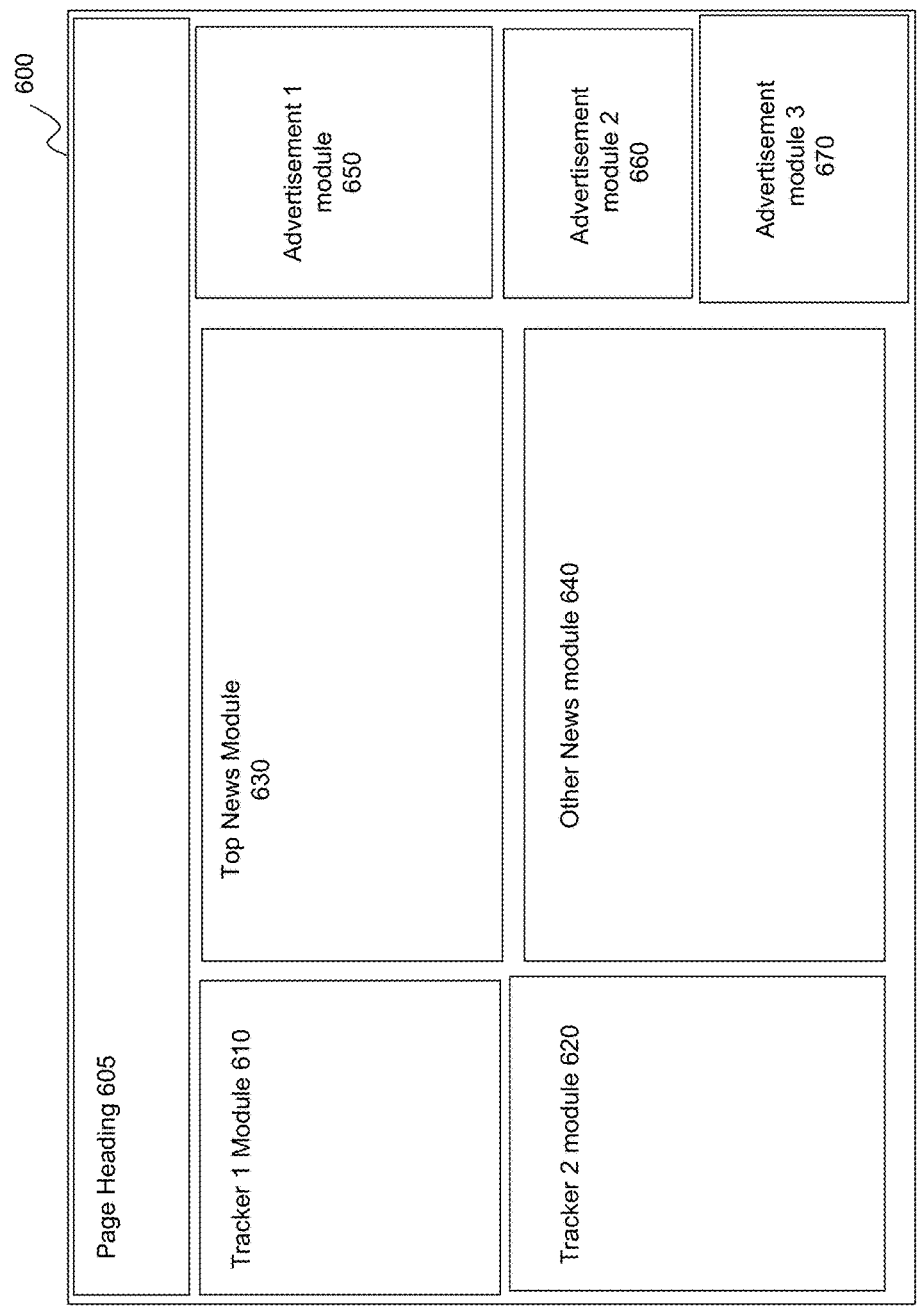
FIGS. 6(b)-(c) depict exemplary template layouts; in accordance with an embodiment of the disclosure.
Figure 6C:
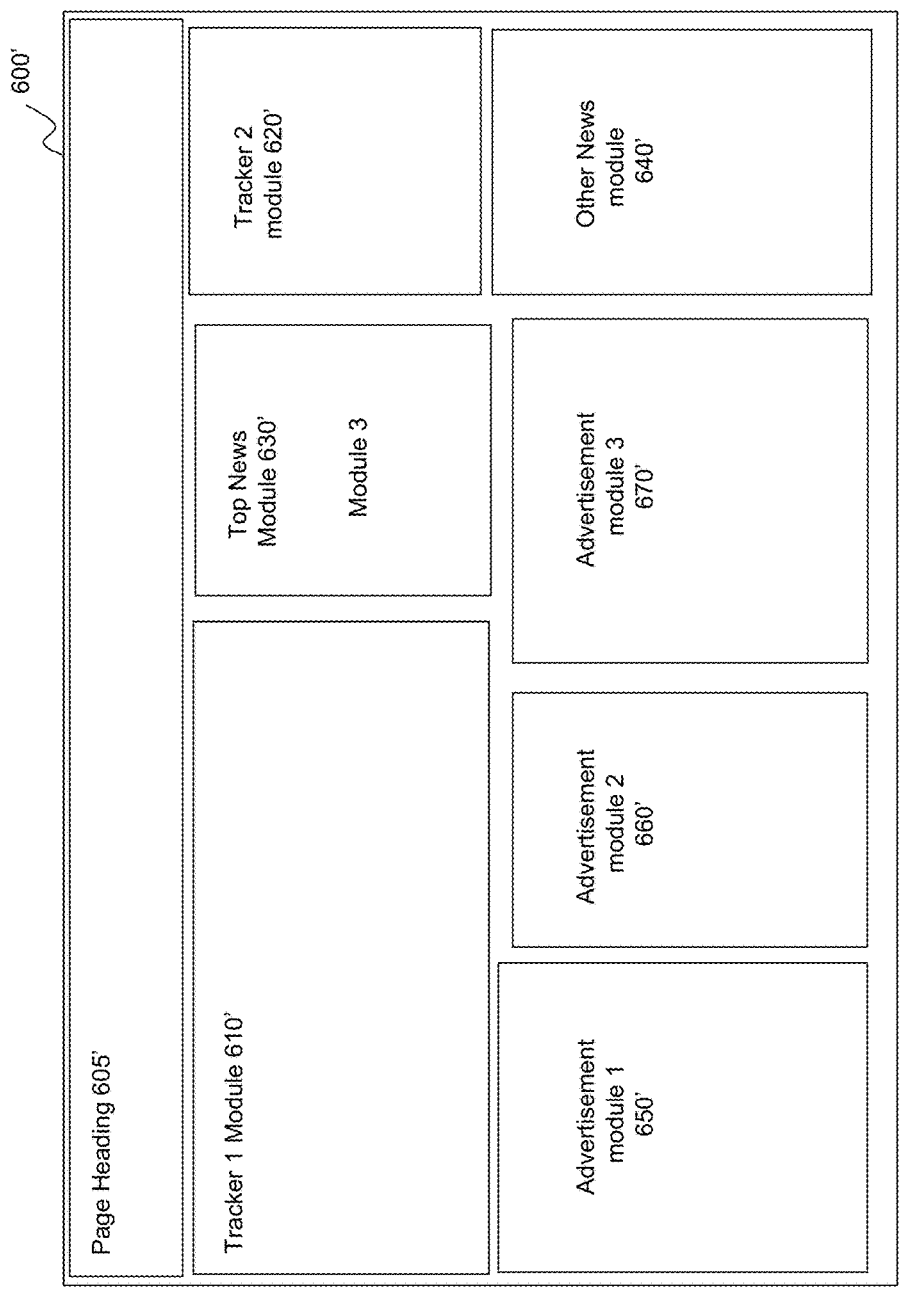

For each user group, a customized template layout is assigned. FIG. 6(*a*) represents a typical web site design for a financial portal, such as Yahoo® Finance. FIG. 6(*b*) schematically represents the template for the layout of the web site depicted in FIG. 6(*a*). As can be seen, first template layout 600 for the web page contains various modules, 610-670. Some modules, may be tracker modules (610 and 620), some contain, news information (630 and 640), and some may be advertisements (650-670). As will be appreciated, the modules are not limited to these types of modules but may also contain charts, diagrams, and textual information from various sources such as analysts, third-party content aggregators like Twitter®, and stock market feeds. FIG. 6(*c*) depicts a template layout 600' that may be assigned to a user group. As will be appreciated by those skilled in the art, any number of template layouts are possible for any number of user groups. Alternatively, the number of user groups and associated templates may be fixed. As will be noted the templates 600 and 600' depicted in FIGS. 6(*b*) and (*c*) respectively, contain the same information, but it is displayed differently on the page. For example, in FIG. 6(*b*) Tracker 1 module 610 occupies approximately the same area on the template and is vertically aligned with Tracker 2 module 620. Top news module 630 takes up a majority of the space on the template and occupies a central location. Contrastingly, in FIG. 6(*c*), the template 600' assigned to the user group contains the same modules, but in a different layout. As seen in FIG. 6(*c*) Tracker 1 module 610' occupies more space then before and is vertically aligned and adjacent to advertisement 1 modules 650' and advertisement 2 module 660'. Further, Tracker 2 module 620' has been elevated to the same horizontal level as Tracker 1 module 610'. The design of template 600' may be assigned based on the user group's preference to utilize Tracker 1 module 610' over tracker 2 module 620'. Similarly, the template 600' may have been selected/generated because users with in the user group tend to click on Tracker 1 module 610' immediately after viewing top news module 630'. As will be appreciated by those skilled in the art, associations between modules may be customized and arranged in a large number of combinations allowing for large numbers of user groups.

As can be seen, the focal point for template 600' is reflected in the layout in which the central content is Tracker 1 module 610'. This focal point may be estimated based on the user's space_id and view distribution. Once a personalized template is generated according to an embodiment of the present disclosure, the content is arranged in accordance with a user's specific view parameters and hardware.

As a result of the personalization offered by the present disclosure, advertisement placement or association in relationship to specific modules may be more valuable to an advertiser or content provider. Accordingly, in an embodiment, the template generation engine may offer placement of advertisements and/or content placement based on a third-parties willingness to pay money in exchange for a specific location within the personalized web page. For example, if it is determined that users of a specific user group are more prone to click on adds adjacent to Tracker 1 module 610' for example, an advertiser or content provider may be willing to pay more to advertise on a template that places or associates adds closer to Tracker 1 module 610'. In this manner, a content provider such as Yahoo® may gather data associated with user's behaviors and monetize the utilization of personalized templates. Likewise, a standalone provider may be utilized to generate, track and assign users to a user group and monetize such services by offering advertisers different placements on the personalized templates based on user group preferences.

In some embodiments, the multiple pieces of content to be included in a personalized template may be from a single source, e.g., a content provider such as Yahoo!® or from multiple sources. In either case, if the template generation engine 160 has permission to use content from the sources, the template generator 230 may render the personalized template before it is accessed by the user and store a copy in 720 or 260 for future use. This may include the situation in which the single content source is the personalized template generation engine 160 source, which may be a content provider and at the same time, it may bootstrap from its content reserves to create templates that integrate existing content in a meaningful way.

Figure 7:
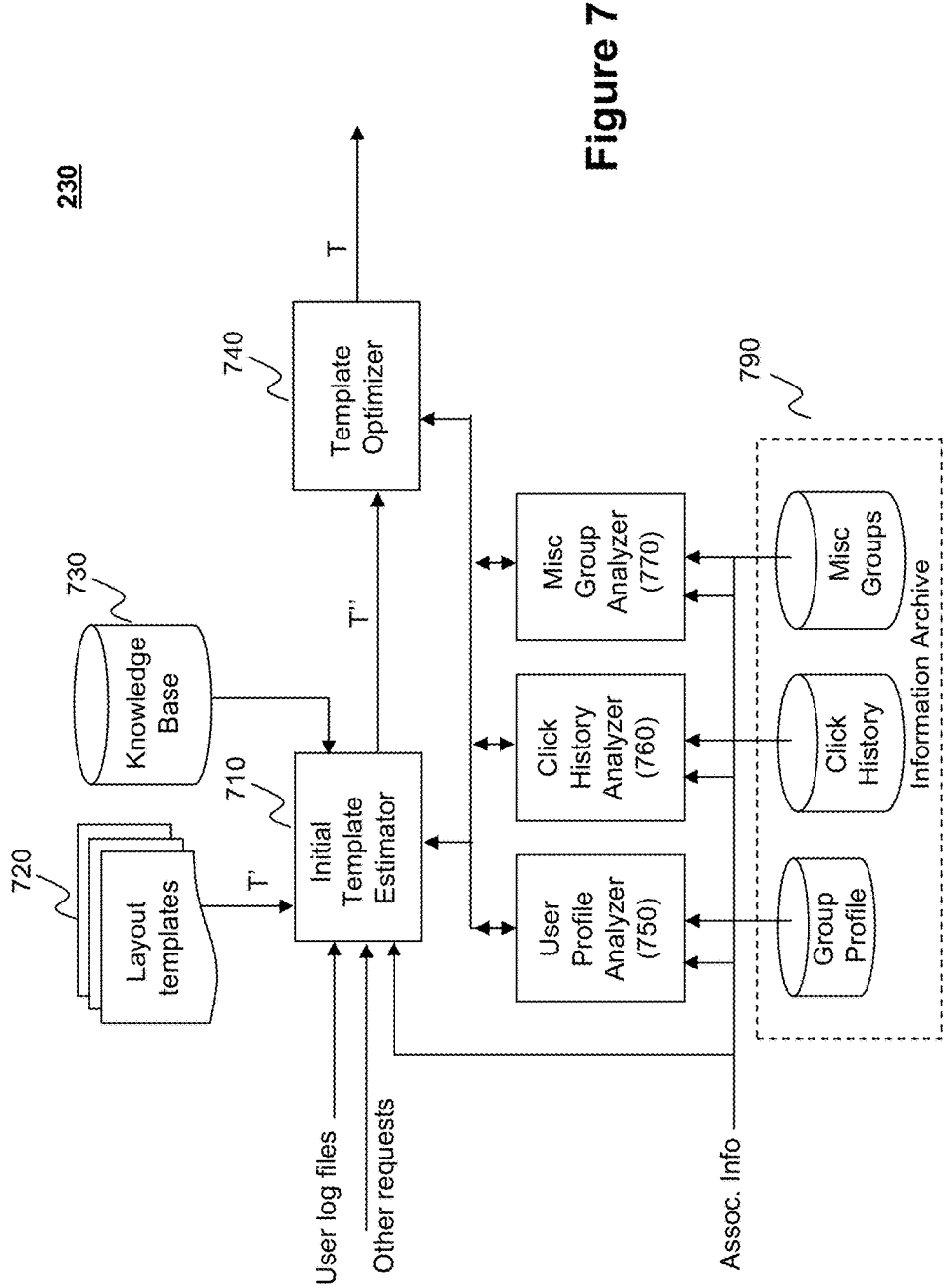
FIG. 7 is a block diagram of an exemplary template generator.

FIG. 7 is an exemplary block diagram of the template generator 230, which may be an integral part of template generation engine 160 or may be a separate process according to an embodiment of the present disclosure. The exemplary template generator 230 may include an template estimator 710 and a template optimizer 740. The template estimator 710 may obtain and assign an initial template based on the preprocessing log file analysis.

To further refine and personalize a template appropriate with respect to a characterization of a user group, the initial template estimator may invoke different analyzers to analyze information from different sources. Each analyzer may assist the template estimator 710 to obtain some information with respect to some aspects of the underlying user group interests. For example, a user profile analyzer 750 may be provided to analyze the profiles of the group members, stored in a user profile database in an information archive 790. User profile analyzer may be the same or different that log file preprocessor 210 and may be performed by the same or different provider. Likewise, information archive 790 may contain the same or additional information as user logs 190 and both may be used separately or in conjunction to analyze the user's past behaviors. The analysis result with respect to a users' profiles may help to determine the focal point of the user group and aid in assigning a personalized template based on a user's profile. The user profile analyzer 750 may determine that the users have an interest in financial news or sports.

A click history analyzer 760 may also be provided to analyze click patterns of the users within the group or others to provide information to assist the template estimator 710 to generate a personalized template. When invoked, the click history analyzer 760 may examine both the click history of the user and that of other users within the user group, stored in a click history database in the information archive 790. Such analysis may aid user profile analyzer 750 to better understand, the context of the click history or the likely module associated with the present click. For instance, if the user of a current template had a number of other clicks after accessing top news stories, such information may be singled out by the click history analyzer 760 and it may be estimated that the current click history is associated with a particular interest in a module. Such information may be of value to the template estimator 710 in determining module placement in a layout template.

In addition, the template estimator 710 may also invoke a group analyzer 770 to check, for example, whether the user is a member of any social group based on information stored in a social group database in the information archive 790 and if so, whether any members of the same social group have similar profiles. If so, the template estimator 710 may further request the similar user's information to find out whether there are any templates associated with users with similar interests. There may be other analyzers that the template estimator 710 may invoke, depending on the situation (not shown). Results returned from those analyzers (e.g., 750-770) may then be used by the initial template estimator 710 in obtaining a template that is consistent with the focus or topic of the query.

With different analysis results received from the analyzers 750-770, the template estimator 710 may obtain an initial template in different ways. For example, it may be retrieved from a storage 720 which may be where various templates are stored. Storage 720 may be the same or different than stored templates 260 depending on the providers configuration. If a stored template from either 260 or 720 satisfies the personalization requirements and/or the focal point of the current user group, it may be deployed for the specific user group. Each stored template may be associated with some group and some other features. Such stored templates may be previously created either by a human template designer or by a computer (not shown) based on some previously determined group preferences. Such stored templates may be categorized for indexing and searching purposes. The categorization may be at multiple levels, each of which may or may not be based on topics. For instance, templates may be classified first based on group behaviors, e.g., "track a stock", "find news", etc. Then in each behavior, e.g., "track a stock", it may be further classified based on the nature of the action such as "news", "trading", "analysts" etc. For instance, for a user group interested in finance, a template may be stored with a layout that does not include a module for weather forecast information.

Alternatively, when no appropriate existing template can be identified from storage 720 or 260, the template estimator 710 may create one based on a groups' focal points. Such a created personalized template may be created based on a variety of information provided by analyzers 750-770 and some basic group information. In generating a template, various rules or heuristics, stored in a knowledge base 730 may be used. The initial template, denoted as T" in FIG. 7, may be sent to the template optimizer 740, which may further refine the template. The refinement may be based on a more detailed analysis of various types of information or user interactions, in light of other information provided by analyzers 750-770.

As discussed herein, there may be other modes of operation in which the present teaching is applied to create personalized templates which can then be used by another party, such as a search engine, as content to be provided to users when needed.

Computer hardware platforms may be used as the hardware platform(s) for one or more of the elements described herein (for example, the template generator, the preprocessor or the user classifier). The hardware elements, operating systems and programming languages of such computers are conventional in nature, and it is presumed that those skilled in the art are adequately familiar therewith to adapt those technologies to implement the personalized template processing essentially as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 8:
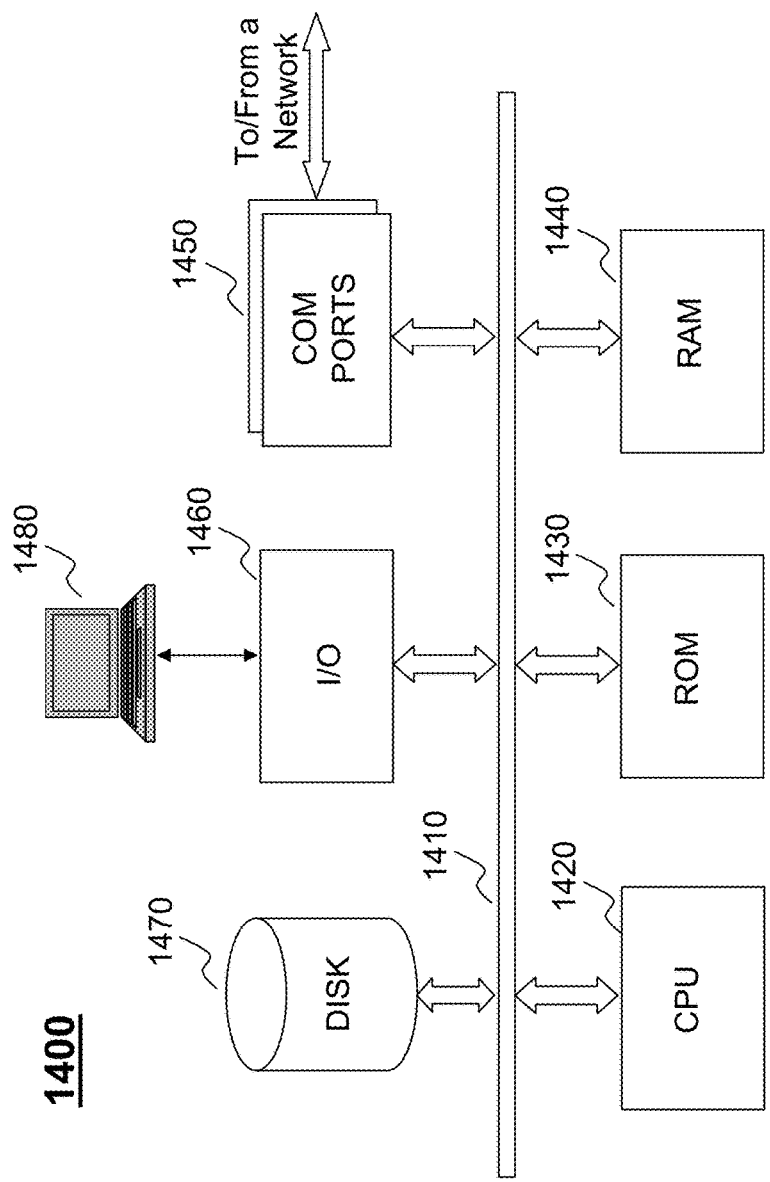
FIG. 8 depicts a general computer architecture on which the present teaching can be implemented.

FIG. 8 provides a functional block diagram illustration of a computer hardware platform which includes user interface elements. The computer may be a general purpose computer or a special purpose computer. This computer 800 can be used to implement any components of the personalized template generation architecture as described herein. For example, the template generator that produces a template, the classifier that analyzes user behavior and assigns a user to a user group, the pre processor module that analyzes historical log data, can all be implemented on a computer such as computer 800, via its hardware, software program, firmware, or a combination thereof. Although only one such computer is shown, for convenience, the computer functions relating to personalized template generation may be implemented in a distributed fashion on a number of similar platforms, to distribute the processing load.

The computer 800, for example, includes COM ports 850 connected to and from a network connected thereto to facilitate data communications. The computer 800 also includes a central processing unit (CPU) 820, in the form of one or more processors, for executing program instructions. The exemplary computer platform includes an internal communication bus 810, program storage and data storage of different forms, e.g., disk 870, read only memory (ROM) 830, or random access memory (RAM) 840, for various data files to be processed and/or communicated by the computer, as well as possibly program instructions to be executed by the CPU. The computer 800 also includes an I/O component 860, supporting input/output flows between the computer and other components therein such as user interface elements 880. The computer 800 may also receive programming and data via network communications.

Hence, aspects of the methods of generating personalized templates, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the search engine operator or other personalized template provider into the hardware platform(s) of a computing environment or other system implementing a computing environment or similar functionalities in connection with generating the personalized templates based on user behavior. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the user grouping classifier and template generation engine and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method for generating a personalized layout of content, implemented on a machine having at least one processor, storage, and a communication platform connected to a network, comprising:

monitoring web browsing activities of a user in a web browsing session, via the communication platform;

determining a view distribution for the user based on the monitored activities of the user with respect to each portion of each of a plurality of web pages viewed by the user within the web browsing session, wherein the view distribution comprises a list of numbers each of which represents a number of times the user viewed a respective portion of the plurality of web pages;

adaptively assigning the user to a user group from a plurality of user groups based on the view distribution, the adaptive assignment including detecting a change in the user's web browsing activities and reassigning the user to a different user group;

selecting a layout template for the user based on the user group assignment, wherein the layout template specifies a layout of content and is selected such that space on the layout template prioritizes a web page portion that received most views per the view distribution, and wherein the prioritization includes allocating more space for content provided at the web page portion;

arranging a plurality of pieces of content according to the layout template;

providing the arranged plurality of pieces of content to the user, wherein the arranging is based on the user group assignment;

determining statistics associated with a plurality of users in the user group to which the user is assigned;

updating a record associated with a content provider in connection with the layout template based on the statistics; and receiving a payment made in association with the layout template and computed based on the record.

2. The method of claim 1, wherein the monitoring of web browser activities includes monitoring at least one of the following:

web site visits, content selection, user profile data, book marks, module selections, radio button selections, module controls, module players, widget controllers, inputting data to online forums, text messaging, updating social network status, and search queries.

3. The method of claim 1, further comprising:

responsive to the reassignment, selecting a new layout template that prioritizes the space to a different web page portion; and rearranging the plurality of pieces of content according to the new layout template.

4. The method of claim 1, wherein the user is assigned to the user group because the user's view distribution is similar to view distributions of other users in the user group.

5. The method of claim 1, wherein the layout template is assigned to the user group based on at least one of the following:
user interests, user behavior, advertisement placement, paid for content placement, media type placement, content availability, content features availability, and performance of previous template assignments.

6. The method of claim 1, further comprising:
determining whether the user has an existing profile;
responsive to a determination that the user does not have an existing profile, assigning a default template to the user;
determining whether the view distribution includes enough information about the user's behavior to be able to assign the user to a group,
wherein the user is adaptively assigned to the user group responsive to a determination that the view distribution includes enough information about the user's behavior.

7. The method of claim 1, further comprising:
determining a plurality of user groups using K-means clustering algorithm, wherein a number of the user groups is predetermined;
training a machine learning classifier based on output of the K-means clustering algorithm,
wherein the adaptive assignment is performed using the trained classifier.

8. A method implemented on a machine having at least one processor, storage, and a communication platform connected to a network, comprising steps of:
analyzing, via a clustering engine running on one of the at least one processor of the machine, a plurality of user identifiers to cluster one or more users into a user group from a plurality of user groups based on their view distributions, wherein each view distribution corresponding to a particular user is determined with respect to each portion of each of a plurality of web pages viewed by the particular user within a given web browsing session and comprises a list of numbers each of which represents a number of times the particular user viewed a respective portion of the plurality of web pages, the web page viewing of the particular user being monitored such that the particular user is adaptively assigned to the user group, the adaptive assignment including detecting a change in the particular user's web page viewing and reassigning the particular user to a second user group;
generating, via a template generation engine running on one of the at least one processor of the machine, a display template that specifies a layout of content for display of a plurality of pieces of content to one or more users of the user group, such that space on the display template prioritizes a web page portion that received most views per the view distribution, wherein the prioritization includes allocating more space for content provided at the web page portion; and
arranging the plurality of pieces of content for display to the one or more users, wherein the arranging of the plurality of pieces of content is based on the user group assignment and according to the display template generated;
determining statistics associated with a plurality of users in the user group to which the user is assigned;
updating a record associated with a content provider in connection with the display template based on the statistics; and
receiving a payment made in association with the display template and computed based on the record.

9. The method of claim 8, further comprising:
generating a second display template based on the reassignment; and
updating the arrangement of the plurality of pieces of content on the user's display based on the second display template, and wherein the reassignment is responsive to the detection of the change in the user's web page viewing such that the second display template is generated that prioritizes the space to a different web page portion.

10. The method of claim 9, wherein the arrangement is not updated until at least one of a next login, next day, next session, or a change in context, the change in context including where the user has moved on to a new task or where available content to be displayed has significantly shifted.

11. The method of claim 9, wherein the reassignment is based in part on online user feedback.

12. The method of claim 8, wherein the display template is generated based on which group the user is assigned.

13. The method of claim 8, wherein the generating comprises:
selecting a template from a template library based on a certain criterion appropriate to the user group.

14. The method of claim 8, wherein the display template is generated based on at least one of the following:
the user's profile data, user-provided data, search behaviors, search history, click history, book marking activities, and relation to other users.

15. The method of claim 8, wherein the plurality of pieces of content are determined with respect to an underlying topic of interest of the user, and
wherein the display template is generated based on the underlying topic.

16. The method of claim 8, wherein the layout template is indexed for subsequent use by a user of the user group.

17. A computer system having at least one processor, storage, and a communication platform connected to a network, wherein the at least one processor is programmed to execute one or more computer program instructions which, when executed, cause the at least one processor to:
adaptively assign a user to a user group from a plurality of user groups based on information related to the user, the information including a view distribution corresponding to the user, the adaptive assignment including detecting a change in the user's web browsing activities and reassigning the user to a second user group, wherein the view distribution:
is determined based on monitored web browsing activities of the user with respect to each portion of each of a plurality of web pages viewed by the user within a given web browsing session and
comprises a list of numbers each of which represents a number of times the user viewed a respective portion of the plurality of web pages;
generate a layout template created based on the user's group assignment, wherein the layout template specifies a layout of content and is selected such that space on the layout template prioritizes a web page portion that received most views per the view distribution, and wherein the prioritization includes allocating more space for content provided at the web page portion; and arrange a plurality of pieces of content for display to the user based on the layout template;

determine statistics associated with a plurality of users in the user group to which the user is assigned;

update a record associated with a content provider in connection with the layout template based on the statistics; and receive a payment made in association with the layout template and computed based on the record.

18. The computer system of claim 17, wherein the layout template further comprises a specification of at least one of a font, a color, and a border of the pieces of content to be arranged within the layout template.

19. The computer system of claim 17, wherein the reassignment comprises:

detection of the change in the user's web browsing activities such that a different layout template is generated that prioritizes the space to a different web page portion and rearrangement of the plurality of pieces of content for display to the user based on the different layout template.

20. The computer system of claim 19, wherein the at least one processor is further caused to utilize a learning mechanism to determine the second user group based on online behaviors.

21. A computer system having at least one processor, storage, and a communication platform connected to a network, wherein the at least one processor is programmed to execute one or more computer program instructions which, when executed, cause the at least one processor to:

adaptively assign a user to a user group selected from among a plurality of user groups based on a view distribution of the user, the adaptive assignment including detecting a change in the user's web browsing activities and reassigning the user to another user group of the plurality of user groups;

generate a personalized template for the user based on the user's group assignment, wherein the view distribution is determined based on monitored web browsing activities of the user with respect to each portion of each of a plurality of web pages viewed by the user within a given web browsing session and comprises a list of numbers each of which represents a number of times the user viewed a respective portion of the plurality of web pages, and specify a layout of content generated such that space on the layout prioritizes a web page portion that received most views per the view distribution, wherein the prioritization includes allocating more space for content provided at the web page portion;

interface with the user;

analyze the user's view distribution; and search one or more pieces of content based on a query and arrange the one or more pieces of content for display to the user based on the personalized template;

determine statistics associated with a plurality of users in the user group to which the user is assigned;

update a record associated with a content provider in connection with the template based on the statistics; and receive a payment made in association with the template and computed based on the record.

22. The computer system of claim 21, wherein the user shares the user's behavior with a plurality of users assigned to the user group, and wherein the reassignment comprises detection of the change in the user's web browsing activities such that a different personalized template is generated that prioritizes the space to a different web page portion, and wherein the content search platform is further configured to rearrange the one or more pieces of content for display to the user based on the different personalized template.

23. The computer system of claim 21, wherein the personalized template denotes at least one of colors, fonts, borders, and headings for personalizing display characteristics.

24. A machine readable non-transitory and tangible medium having information recorded thereon for personalized templates, wherein the information, when read by the machine, causes the machine to perform the following:

monitoring web browsing activities of a user in a web browsing session, via the communication platform;

determining a view distribution for the user based on the monitored activities of the user with respect to each portion of each of a plurality of web pages viewed by the user within the web browsing session, wherein the view distribution comprises a list of numbers each of which represents a number of times the user viewed a respective portion of the plurality of web pages;

adaptively assigning the user to a user group from a plurality of user groups based on the view distribution, the adaptive assignment including detecting a change in the user's web browsing activities and reassigning the user to a different user group;

selecting a layout template for the user based on the user group assignment, wherein the layout template specifies a layout of content and is selected such that space on the layout template prioritizes a web page portion that received most views per the view distribution, and wherein the prioritization includes allocating more space for content provided at the web page portion;

arranging a plurality of pieces of content according to the layout template;

providing the arranged plurality of pieces of content to the user, wherein the arrangement of content is displayed according to the user group assignment;

determining statistics associated with a plurality of users in the user group to which the user is assigned;

updating a record associated with a content provider in connection with the layout template based on the statistics; and receiving a payment made in association with the layout template and computed based on the record.

* * * * *